United States Patent
Lopez-Abancens (10) Patent No.: US 10,739,180 B2
(45) Date of Patent: Aug. 11, 2020

(54) DETERMINING A VOLUME OF GAS INSIDE A LIQUID SUPPLY SYSTEM

(71) Applicant: Hewlett-Packard Development Company, L.P., Houston, TX (US)

(72) Inventor: Jose Antonio Lopez-Abancens, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 298 days.

(21) Appl. No.: 15/569,926

(22) PCT Filed: Jul. 15, 2015

(86) PCT No.: PCT/EP2015/066211
§ 371 (c)(1),
(2) Date: Oct. 27, 2017

(87) PCT Pub. No.: WO2017/008853
PCT Pub. Date: Jan. 19, 2017

(65) Prior Publication Data
US 2018/0149510 A1    May 31, 2018

(51) Int. Cl.
*G01F 22/02* (2006.01)
*B41J 2/195* (2006.01)

(52) U.S. Cl.
CPC .............. *G01F 22/02* (2013.01); *B41J 2/195* (2013.01)

(58) Field of Classification Search
CPC ........................................................ G01F 22/02
See application file for complete search history.

(56) References Cited

U.S. PATENT DOCUMENTS

| 5,001,924 A | 3/1991 | Walter et al. |
| 5,460,030 A * | 10/1995 | Bloxsom ................. G01F 17/00 73/149 |
| 5,673,073 A | 9/1997 | Childers et al. |
| 6,036,296 A * | 3/2000 | Axtell .................. B41J 2/17513 347/7 |
| 6,161,913 A | 12/2000 | Childers et al. |
| 6,318,851 B1 * | 11/2001 | Hoen .................... B41J 2/17556 347/92 |

(Continued)

FOREIGN PATENT DOCUMENTS

| EP | 0840098 | 5/1998 |
| WO | WO-0073745 | 12/2000 |

(Continued)

OTHER PUBLICATIONS

Nimisha Srivastava etal., "Microfluidic Pressure Sensing Using Trapped Air Compression", Lab Chip, 2007, 7, 633-637, Issue 5.

*Primary Examiner* — David L Singer
(74) *Attorney, Agent, or Firm* — HP Inc. Patent Department (57) ABSTRACT

A known volume of liquid is delivered to a liquid supply system. A first pressure of the liquid supply system after delivery of a first known volume of liquid into the liquid supply system is determined. A second pressure of the liquid supply system after delivery of a second known volume of liquid into the liquid supply system is determined. The volume of compressible gas trapped in the liquid supply system is determined from the second known volume of delivered liquid and the first and second pressures.

17 Claims, 7 Drawing Sheets

(56) References Cited

U.S. PATENT DOCUMENTS

| | | | |
|---|---|---|---|
| 6,321,597 B1* | 11/2001 | Demers | G01F 22/02 |
| | | | 73/149 |
| 6,761,445 B2 | 7/2004 | Hoen et al. | |
| 7,347,089 B1* | 3/2008 | Kelley | G01F 17/00 |
| | | | 73/149 |
| 7,559,223 B2 | 7/2009 | chen et al. | |
| 7,758,176 B2 | 7/2010 | Kojima | |
| 8,220,502 B1 | 7/2012 | Kelekar et al. | |
| 2005/0041076 A1* | 2/2005 | Katayama | B41J 2/17513 |
| | | | 347/85 |
| 2013/0104668 A1 | 5/2013 | Hanko et al. | |
| 2015/0101403 A1* | 4/2015 | Shepherd | G01F 22/00 |
| | | | 73/149 |

FOREIGN PATENT DOCUMENTS

| | | |
|---|---|---|
| WO | WO-0216883 | 2/2002 |
| WO | WO-2014096875 | 6/2014 |

\* cited by examiner

DETERMINING A VOLUME OF GAS INSIDE A LIQUID SUPPLY SYSTEM

BACKGROUND

Liquid supply systems are components in many apparatuses, for example they may form a printing fluid supply circuit in a printer.

When initialising a printer, a purge process may be used to ensure the printing fluid supply circuit is filled with printing fluid.

BRIEF DESCRIPTION OF THE DRAWINGS

Further details, aspects and examples will be described, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples provide apparatuses and methods to measure volumes of gases inside liquid supply systems. For example, the air trapped inside the printing fluid circuits that supply printers, such as ink supply circuits. Examples may include portable testing apparatuses, for example, for use in setting up, commissioning or servicing printers in the field. Examples may also provide tools for use during development of new printing methods and printing systems, or improved versions of existing printing methods and systems. Examples are based on the "Ideal Gas Law" and may comprise a portable tool that is able to detect and measure the volume of gas (e.g. air) trapped inside the whole of the printing fluid circuits (i.e. any and all of the tubes and other components forming the total printing fluid circuit) in the printers, in an easy and non-invasive way.

When the liquid supply system under test is in a printer, it is useful to know about the existence of, and measure the total volume of, the gas inside the printing fluid circuits, because this can help guarantee the correct function of the print head (among other components) and prevent damage to the print head. Moreover, such test apparatus may be used in the field to help service printers, or diagnose and help correct faults, and can even be used to help test printer mechanisms during their development, in order to improve those print mechanisms. For example, the test apparatuses disclosed herein may be used to develop new and improved purging processes for use by the printer during normal use.

The operating principles of the disclosed examples are based on the different properties of air (i.e. a compressible gas) versus the properties of the printing fluid used in printers (which may be an incompressible printing fluid/water based printing fluid). Accordingly, examples can apply and measure variations of volume, and measure the associated pressures and changes thereof (as described in more detail below), to obtain a measurement of the total volume of air trapped inside the, or each, printing fluid circuit. This may be done by applying the formulations and equations of the "Ideal Gas Law". If the printing fluid is an ink, there may be multiple individual ink circuits for each (e.g. primary) colour ink in use in the ink printer, and examples may provide separate instances of the basic testing apparatus for each colour ink circuit.

The disclosed apparatuses and methods provide a relatively low cost testing tool, which is relatively compact, portable, simple in operation and easy to use and maintain in operative state, all of which may help in the reduction of warranty and maintenance costs in printers.

By way of background to the disclosed examples in the printing field, before some printers starts printing, a start-up process may be used to fill all the printing fluid circuit with the printing fluid, such as ink. This start up process includes eliminating the air inside the tubes and components forming the printing fluid circuit. This process may be performed carefully in order to eliminate as much air as possible from the printing fluid circuit. This process is called a "Purge Process".

The following will now be described in terms of an ink circuit in an ink printer. However, examples may apply to any printing fluid circuit, included in any form of printing system. Examples may be applied to both 2D and 3D printing systems.

The air remaining inside the ink circuit may be minimized. Otherwise, if a large amount of air remains, that air may travel to the print head and could damage the print head, especially at the relatively high pressures/temperatures involved with the normal printing process. This may result in reduced image quality and, in an extreme case, generate irreparable damage in the print head. Any damage in the print head can result in high costs for the customer or high warranty costs for the printer supplier.

It is useful to estimate or measure the volume of air inside the ink circuit after the purge process, at least to validate the purge process has occurred, or measure its effectiveness, so the purge process may be continued/re-applied (if not fully successful). Alternatively or additionally, in examples applied to printing system development, measuring the volume of air trapped in the ink circuit can help improve upon the purge process itself, or help during the servicing, installation or development of different printer mechanisms. It is therefore useful to have a direct method and/or tool to measure the air trapped in the ink circuit. This may allow the measurement of the volume of air remaining in the ink circuit after the purge process. It may also allow the measurement of the volume of air trapped over time during the normal function of the printer to monitor its evolution.

Thus, examples may include a tool (portable or fixed in situ) that is able to detect and measure air trapped inside an entire ink circuit in a printer, in an easy and non-invasive way.

To ensure quick and reliable measurement, the volume of gas (i.e. air) contained in the ink supply circuit may be considered as an "Ideal Gas". The ink or other liquid in the ink supply circuit may be considered an uncompressible liquid. These simplifications may allow the application of the "Ideal Gas Law".

Ideal Gas Law:

The "Ideal Gas Law" equation for gases is a combination of several separate laws, as follows:

Boyle-Mariotte Law: If the temperature remains constant, the volume of a given quantity of gas is inversely proportional to the gas pressure:

$$P \cdot V = k \quad (T, n \text{ constants}) \quad (1)$$

Where:
P=Gas Absolute Pressure. T=Gas Absolute Temperature. V=Gas Volume. n=Number of Gas Moles.
k=constant Charles-Gay Lussac Law: If the pressure remains constant, the volume of a given quantity of gas is directly proportional to the absolute temperature:

$$V = k' \cdot T \quad (P, n \text{ constants}) \quad (2)$$

Where:
P=Gas Absolute Pressure. T=Gas Absolute Temperature. V=Gas Volume. n=Number of Gas Moles.
k'=Constant.

Gay Lussac Law: If the volume remains constant, the pressure of a given quantity of gas is directly proportional to the absolute temperature:

$$P = k'' \cdot T \quad (V, n \text{ constants}) \quad (3)$$

Where:
P=Gas Absolute Pressure. T=Gas Absolute Temperature. V=Gas Volume. n=Number of Gas Moles.
k''=Constant.

Avogadro Law: If the same pressure and temperature conditions are maintained, the volume of a gas depends on the number of moles, i.e. the given quantity of/amount of gas:

$$V = k''' \cdot n \quad (P, T \text{ constants}) \quad (4)$$

Where:
P=Gas Absolute Pressure. T=Gas Absolute Temperature. V=Gas Volume. n=Number of Gas Moles.
k'''=Constant.

The combination of these laws results in the "Ideal Gas Law":

$$P \cdot V = n \cdot R \cdot T \quad (5)$$

Where:
P=Gas Absolute Pressure. T=Gas Absolute Temperature. V=Gas Volume. n=Number of Gas Moles.
k''''=Constant.
R is the universal constant for ideal gasses.
In some examples, R may be the following value:

$$R = 0.082 \frac{\text{atm} \cdot \text{liter}}{\text{K} \cdot \text{mol}} \quad (6)$$

Examples of the disclosure will be now described, which may allow measurement of the trapped gas in the confined volume of a liquid supply system, following the Ideal Gas principles as detailed above.

Figure 1A:
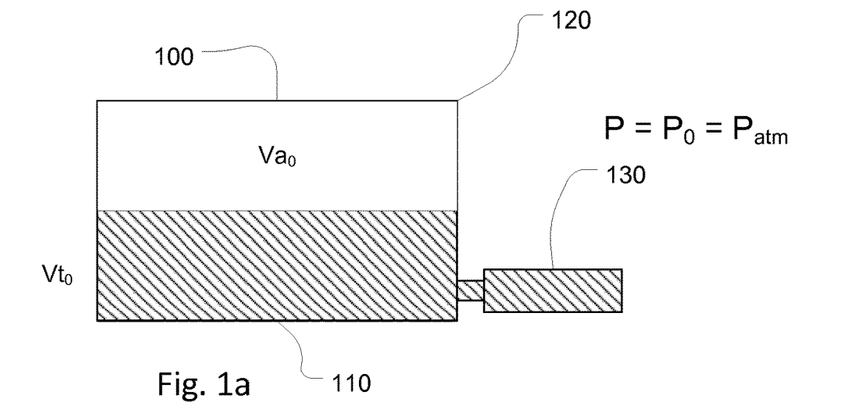
FIGS. 1a, 1b and 1c show examples of a compressible gas and incompressible liquid located in a fixed, confined, volume according to one example.

In an example, referring to FIG. 1a, a confined volume 100 contains a volume of liquid 110 (i.e. an initial volume of liquid in the confined volume="$Vt_0$") and a volume of trapped gas 120 ("$Va_0$"). The trapped gas may be assumed to be substantially undissolved in the liquid (i.e. the amount of gas being dissolved in the liquid leads to less than a predetermined error margin, for example 1%). In other examples, a de-gassed liquid may be used. For example, a de-gassed ink where these inks may have a maximum air content that is, for example, 20% of the maximum solubility of the original non de-gassed ink at room temperature and normal air pressure (e.g. 25° C. and 1 atmosphere). For example, if the ink is water based and the maximum solubility of air inside the water based ink is 0.227 gr/litre at 25° C. and 1 atmosphere, then the maximum air dissolved in the ink may be less than 0.4% in volume (e.g. 0.38% for 775 cc of water based ink having 2.982 cc of air dissolved therein). Examples are not limited to any specific gas solubility of the liquid but this parameter may be factored in to the calculations used in this disclosure.

The system is assumed to be at an initial absolute pressure $P_0 = P_{atm}$ (e.g. sea level atmospheric pressure, but other pressures, both lower and higher, may be suitable. In which case such examples may measure the initial pressure before carrying out the calculations discussed below). In examples that operate in other pressure environments, an initial pressure reading may be used to determine the initial "atmospheric" pressure. Coupled to the confined volume is a liquid delivery mechanism 130 comprising a reservoir of the same liquid as used in the liquid supply system during normal use (so there is no contamination), from which known volumes of the liquid may be controllably delivered into the confined volume 100 over time.

Figure 1B:
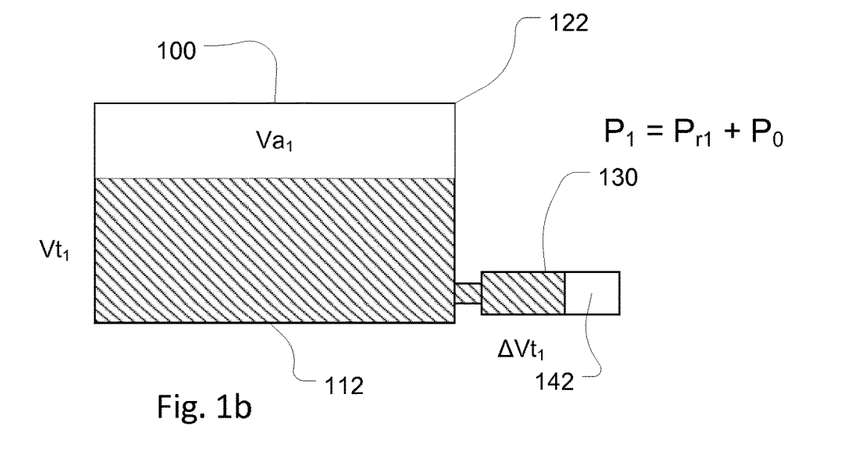

Referring now to FIG. 1b, there is shown a view of the confined volume 100, in which the liquid delivery mechanism 130 has delivered a known volume 142 ($\Delta Vt_1$) of the liquid into the confined volume 100, such that the gas is compressed. This may be considered the first stage. Therefore, the confined volume 100 now comprises a reduced volume gas 122 ($Va_1$) and an increased volume liquid 112 ($Vt_1$). Now, the pressure in the confined volume has increased to a new, higher pressure $P_1$, which equals the original atmospheric pressure $P_0 + Pr_1$—i.e. the original pressure plus a first relative pressure increase due to the delivery of the extra known volume of liquid $\Delta Vt_1$. Thus, there is shown a reduction in volume or compression of the gas 122 in the confined volume 100 as a result of the increase in volume of the liquid in the confined volume 100.

Figure 1C:
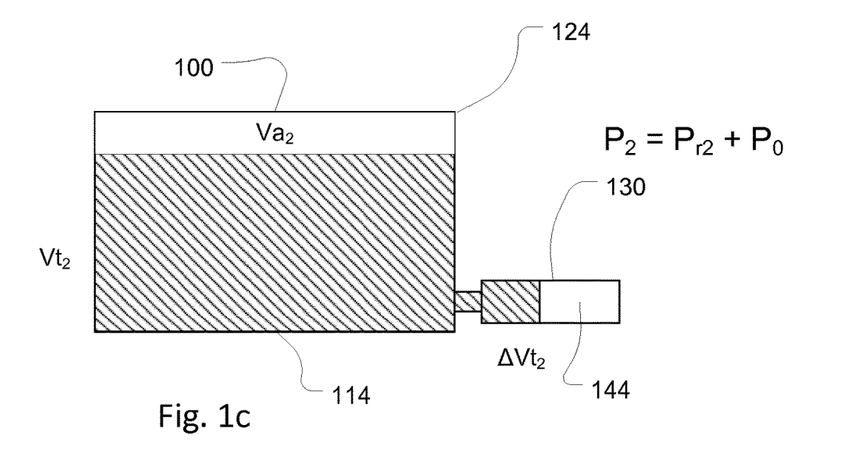

FIG. 1c shows a second stage wherein a further (i.e. second) known volume of liquid 144 ($\Delta Vt_2$) is inserted into the confined volume 100, resulting in a further compression of the gas, resulting in a second compressed volume of gas 124 ($Va_2$), as a result of increased liquid content 114 ($Vt_2$). Now, the pressure in the confined volume has increased to a new, even higher pressure $P_2$, which equals the original atmospheric pressure $P_0 + Pr_2$—i.e. the original pressure plus a second relative pressure increase due to the delivery of the extra known volume of liquid $\Delta Vt_2$.

Using the values of the known volumes of liquid delivered into, and by measuring the resultant increases in pressure inside, the confined volume 100, a measure of the (compressed) volume of gas 120 ($Va_0$) contained within the confined volume 100 may be obtained. This equates to the amount of gas 'trapped' in the confined volume 100, thus allowing a non-visual measurement of the trapped gas using pressure sensing and control of liquid delivery volumes. Examples of the specific equations used to determine the amount of air trapped in the ink circuit (e.g. $Va_0$) are discussed below.

Applying the "Ideal Gas Law" equations outlined above results in:

$T$=constant→$n \cdot R \cdot T$=constant→$P \cdot V$=constant $$P_0 \cdot V_{a_0} = P_1 \cdot V_{a_1} = P_2 \cdot V_{a_2} \quad (7)$$

Where:
$P_0$=Initial Absolute Gas Pressure. $V_{a_0}$=Initial Gas Volume.
$P_1$=Absolute Gas Pressure at Stage 1. $V_{a_1}$=Gas Volume at Stage 1.
$P_2$=Absolute Gas Pressure at Stage 2. $V_{a_2}$=Gas Volume at Stage 2.

$$V_{a_2} = V_{a_1} - \Delta V_{t_2} \quad (8)$$

Where:
$V_{a_2}$=Gas Volume at Stage 2. $V_{a_1}$=Gas Volume at Stage 1. $\Delta V_{t_2}$=Liquid Volume inserted by Stage 2.

$$\rightarrow P_1 \cdot V_{a_1} = P_2 \cdot (V_{a_1} - \Delta V_{t_2}) = P_2 \cdot V_{a_1} - P_2 \cdot \Delta V_{t_2} \quad (9)$$

Where:
$P_1$=Absolute Gas Pressure at Stage 1. $V_{a_1}$=Gas Volume at Stage 1.
$P_2$=Absolute Gas Pressure at Stage 2. $\Delta V_{t_2}$=Liquid Volume inserted by Stage 2.

$$P_2 \cdot V_{a_1} - P_1 \cdot V_{a_1} = P_2 \cdot \Delta V_{t_2} \quad (10)$$

$$V_{a_1} = \frac{P_2 \cdot \Delta V_{t_2}}{P_2 - P_1} \quad (11)$$

Where:
$P_2$=Absolute Gas Pressure at Stage 2. $V_{a_1}$=Gas Volume at Stage 1.
$P_1$=Absolute Gas Pressure at Stage 1. $\Delta V_{t_2}$=Liquid Volume inserted by Stage 2.

$$\rightarrow P_0 \cdot V_{a_0} = P_1 \cdot \frac{P_2 \cdot \Delta V_{t_2}}{P_2 - P_1} \quad (12)$$

Where:
$P_0$=Initial Absolute Gas Pressure. $V_{a_0}$=Initial Gas Volume.
$P_1$=Absolute Gas Pressure at Stage 1. $P_2$=Absolute Gas Pressure at Stage 2. $\Delta V_{t_2}$=Liquid Volume inserted by Stage 2.

$$\rightarrow P_1 = P_{r1} + P_0 \quad (13)$$

$$\rightarrow P_2 = P_{r2} + P_0 \quad (14)$$

Where:
$P_0$=Initial Absolute Gas Pressure. $P_{r1}$=Relative Gas Pressure at Stage 1. $P_{r2}$=Relative Gas Pressure at Stage 2.

$$\rightarrow V_{a_0} = \frac{P_1}{P_0} \cdot \frac{P_2 \cdot \Delta V_{t_2}}{P_2 - P_1} = \frac{P_{r1} + P_0}{P_0} \cdot \frac{(P_{r2} + P_0) \cdot \Delta V_{t_2}}{(P_{r2} + P_0) - (P_{r1} + P_0)} \quad (15)$$

Thus, the amount of trapped gas in the confined volume 100 ($V_{a_0}$) may be calculated using the equation (16) below:

$$V_{a_0} = \frac{(P_{r1} + P_0) \cdot (P_{r2} + P_0) \cdot \Delta V_{t_2}}{P_0 \cdot (P_{r2} - P_{r1})} \quad (16)$$

Where:
$P_0$=Initial Absolute Gas Pressure. $V_{a_0}$=Initial Gas Volume.
$P_{r1}$=Relative Gas Pressure at Stage 1. $\Delta V_{t_2}$=Liquid Volume inserted by Stage 2.
$P_{r2}$=Relative Gas Pressure at Stage 2.
and where the units used are the following:
Volumes=[cm$^3$]
Relative Pressure $P_r$=[psi]
$P_0 = P_{atm}$=1 atm=14.6959 psi Applying equation (16) to a liquid supply system, such as an ink circuit of a printer (or any other liquid supply system in a printer for example the developer circuit of a printer), the air trapped inside the liquid supply system may be measured.

There is now described an example of the disclosure as applicable to an ink printer, where the liquid supply system is an ink circuit.

The ink circuit in a printer can be complicated, with many shapes and corners that make it difficult to eliminate all the air trapped inside. However, the ink circuit is a confined volume, so it possible to measure the amount (i.e. volume) of gas (e.g. air) trapped in that volume using the Ideal Gas Law described above, assuming that the gas is a compressible entity, and the liquid ink is substantially incompressible liquid ink (and with little or no gas dissolved in the liquid— for example a specialised de-gassed ink). Furthermore, by measuring the volume of compressible gas in the ink circuit, it is at least possible to more accurately control the purge process to remove as much of the gas trapped in the ink circuit as possible (for example, at least to below a predetermined maximum volume of gas). This may lead to improved purging, purge process development, servicing ability and the like.

Figure 2:
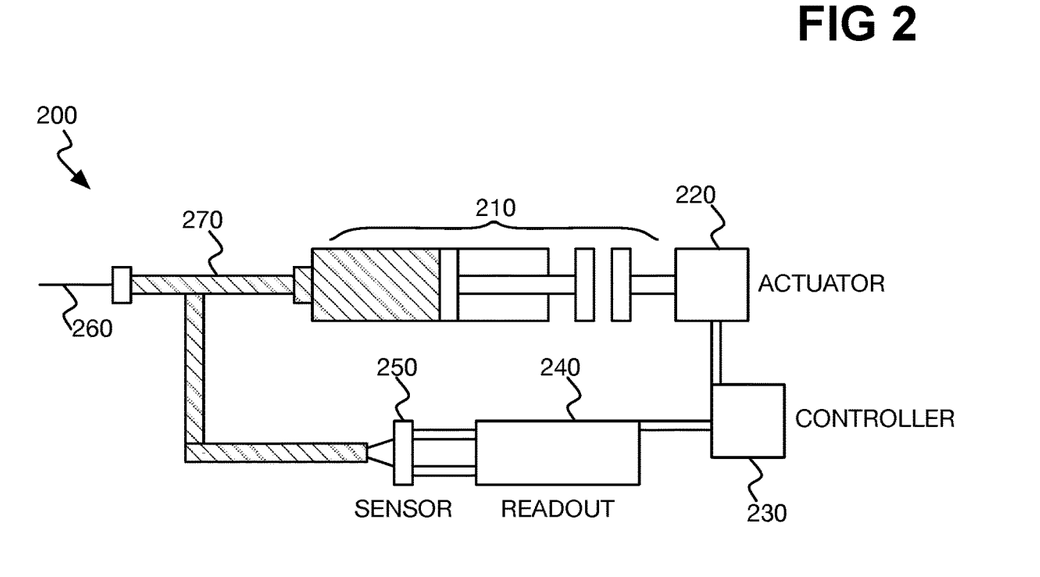
FIG. 2 shows a schematic diagram of an example gas volume measurement apparatus.

Referring now to FIG. 2, there is shown an example 200 of a gas volume measurement apparatus according to this disclosure. This may, for example, provide a testing tool that can be applied to a printer and used to test/measure the volume of the air trapped in any (and all) liquid supply system(s) therein, such as ink circuits. The disclosed specific examples of FIGS. 2 to 6 are an ink circuit gas volume measurement tool.

The example shown in FIG. 2 is a schematic diagram of a single test sub-system, able to carry out the method described above in regard to FIGS. 1a-1c in respect of a single type of liquid. Liquid delivery means 210 is coupled to the liquid supply system under test (not shown) via connection means. For example, the connection means may comprise a needle 260 that can be inserted or connected into the liquid supply system under test, coupled to the liquid delivery system 210 via tubing 270. During use, the tool's liquid components (i.e. the liquid delivery means, tubing, etc) are pre-charged (i.e. pre-filled) with the liquid before connection to the liquid supply system under test. The liquid used in examples is the same liquid used during normal use of the apparatus (e.g. liquid ink of the same colour and type in the case of a printer).

The tool further comprises a pressure sensor 250, coupled to the liquid delivery means via tubing 270. In some other examples, the pressure sensor 250 may be coupled to the liquid supply system (not shown) in an alternative arrangement.

The liquid delivery means 210 comprises a fluid reservoir to contain the liquid for delivery into the liquid supply system, and an actuator 220. In the example shown the fluid reservoir is a syringe, and the actuator acts to force the plunger of the syringe into (or out of) the syringe by a known amount, to thereby deliver a known volume of liquid. For example, a force applied through a coupling between the actuator 220 and plunger forces the liquid from the liquid delivery means 210, through the supply line and through a connection means (e.g. needle) 260, and onwards into the liquid supply system under test (not shown).

Changes in pressure internally in the apparatus 200, including the supply line 270, liquid delivery means 210, connection means 260, or any system (e.g. a printer ink supply circuit) connected to connection means 260, may be accurately monitored and measured using pressure sensor 250, by virtue of its in fluid contact with tubing 270. The pressure sensor may be connected to pressure readout 240 for external display of the pressure. The pressure sensor is electrically coupled to a controller 230, which is operable to control the volume of liquid delivered by the liquid delivery means 210 in order to determine the volume of trapped air. For example, the controller 230 may be electrically coupled to the pressure sensor 250 and configured to determine a first pressure of the liquid supply system from the pressure sensor 250 after the liquid delivery means 210 has delivered a first known volume of liquid into the liquid supply system, and then determine a second pressure of the liquid supply system from the pressure sensor 250 after the liquid delivery means 210 has delivered a second known volume of liquid into the liquid supply system, and determine the volume of compressible gas in the liquid supply system from the first and second known volumes and first and second known pressures.

The controller may control actuator 220, to directly control the volume of liquid delivered into the liquid supply system, or the controller may just be informed of the volume of liquid that has been delivered into the liquid supply system. Thus examples may include manual and/or automatic deliver of liquid. When manual actuation is used, the actuator may be configured to provide an indication of the extent or amount of actuation to the controller, such that the controller may know the exact volumes of liquid delivered into the liquid supply system under test.

Figure 3:
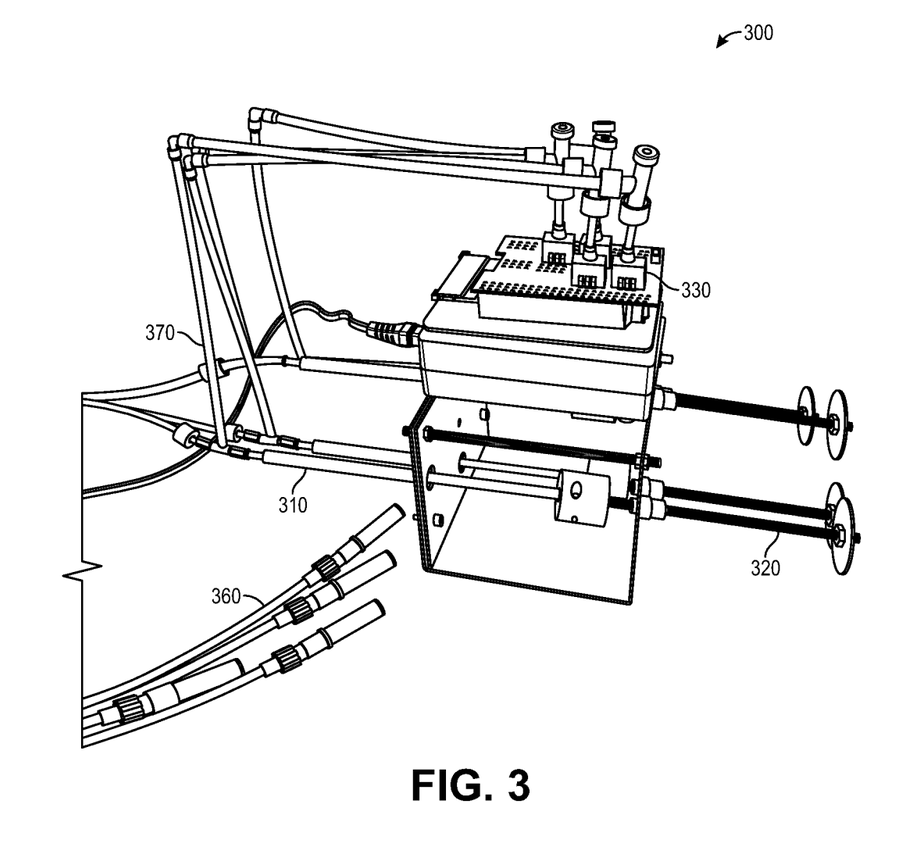
FIG. 3 shows a photograph of a second, real life, example gas volume measurement apparatus.

Referring now to FIG. 3, there is shown a real life example 300 of the disclosed tool for measuring air trapped in a printer with four colour inks (e.g. CMYK), therefore includes four ink supply circuits. The example shown therefore includes four tool sub-systems, one for each of the colour ink circuits under test, and each comprising an individual liquid delivery means 210, and associated pressure sensor 250, connection means 260, and the like. Thus, there is shown manual rotary actuators 320, a controller assembly having surface mount pressure sensors thereon 330, tubing 370, connection means 360 (in the form of industry standard ink connectors) and syringes 310. It would be understood by the skilled person that other reasonable numbers of tools and colour ink circuits would be within the scope of the disclosure.

In the example apparatus 300 graded manual drive screws 320 are connected to liquid delivery means (syringes) 310 and may be used to replace actuator 220 of FIG. 2 and allow a controlled quantity of liquid to be delivered. This may be accomplished, for example, with knowledge of the screw thread and calculation of number of turns per unit distance moved, allowing a known volume of liquid delivered to be calculated. Supply lines/tubing 370 contain the separate ink colours, joining connectors 360 to syringes 310 and controller including mounted pressure sensors 330.

According to examples, the volumes of the liquid delivered into the liquid supply system (i.e. $\Delta Vt_1$ and $\Delta Vt_2$, described above), in order to test the volume of trapped air (i.e. $Va_0$) are relatively small. The choice of specific volumes of liquid used (i.e. delivered into the liquid supply system) may be relatively large or relatively small, it does not matter which, so long as the volume(s) used is known exactly in a particular instance. However, the volumes used may be such that there is no damage caused to any component of the liquid supply system under test (for example, in a printer, the print heads) during use, because using small volume of liquid, the pressure changes are also low. This is to say the maximum pressure used in the described apparatus and method (e.g. testing tool) should be equal or less to the maximum pressure allowable in the printer circuit to avoid damage to the printer components.

Figure 4:
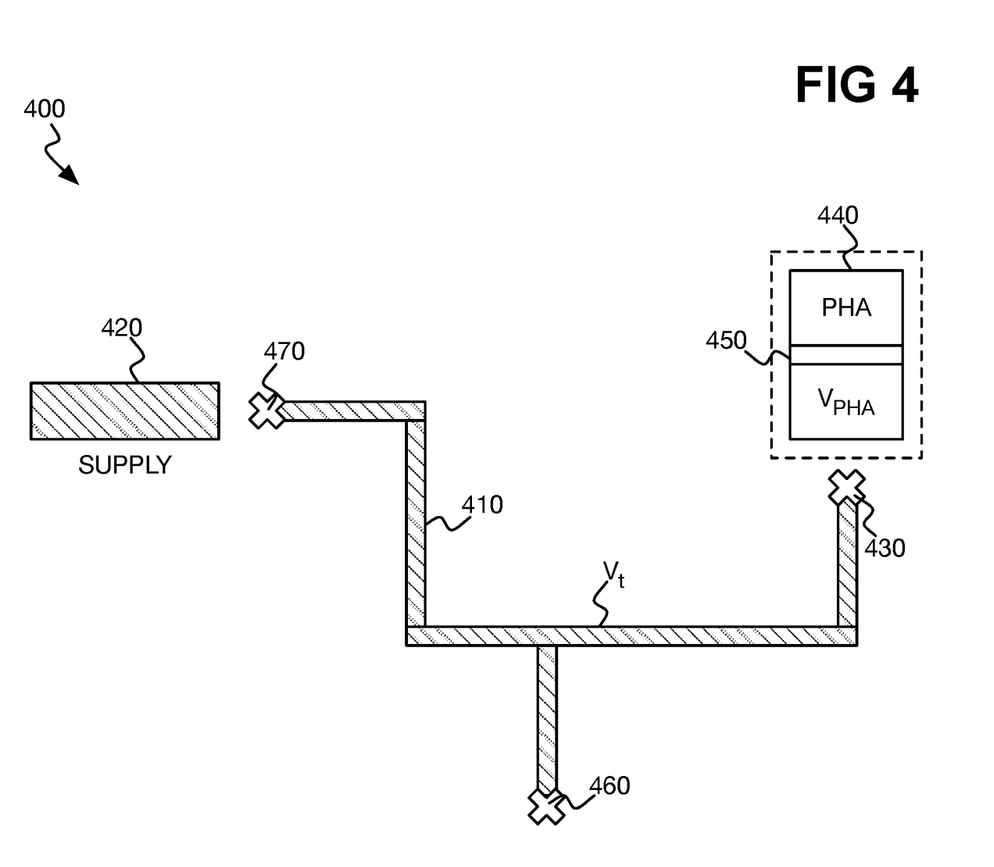
FIG. 4 shows a schematic diagram of an example liquid supply system in the form of an ink supply circuit in an ink printer.

Referring now to FIG. 4, there is shown an example of a liquid supply system that can be tested according to the disclosed apparatus, which in this specific example is an ink circuit 400. The ink circuit 400 may include ink supply 420 (the supply for actual printing use), ink supply lines/tubing 410, ink supply port 470, printer head port 430 and purge port 460. The ink supply circuit may or may not further include a printer head 440. Purge port 460 may be used to purge the liquid supply lines. Print head 440 includes regulator 450 to regulate pressure and avoid damage to the print head 440. Print head 440 may attach to liquid supply line 410 via print head port 430.

The liquid supply lines 410 contain the liquid, for example ink, but also may include a volume of trapped gas (Vt) The printer head 440 may include its own portion of trapped gas ($V_{PHA}$). The apparatus and methods according to the present disclosure are able to determine Vt and $V_{PHA}$, according to different arrangements, as follows.

Figure 5:
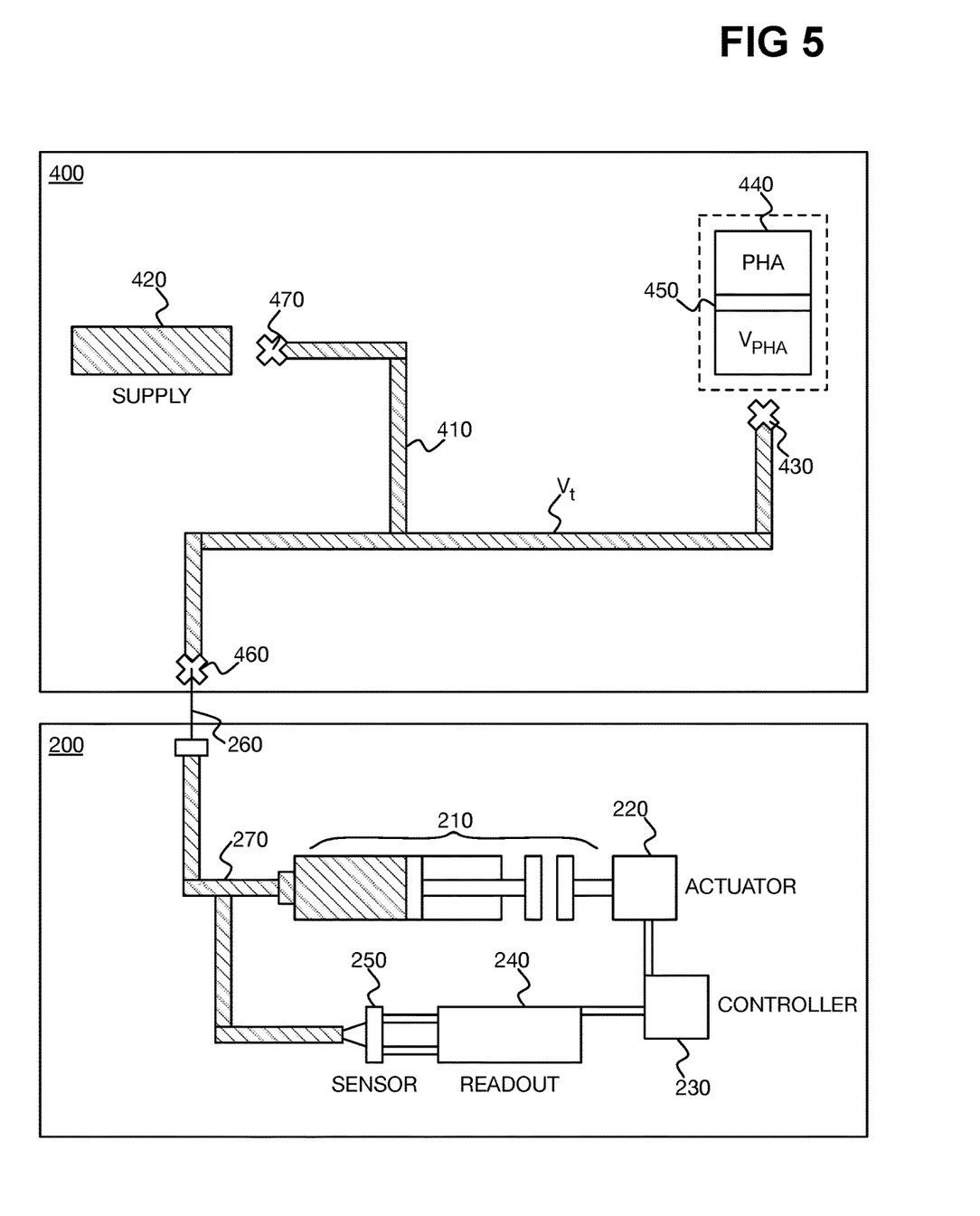
FIG. 5 shows a schematic diagram of the example gas volume measurement apparatus of FIG. 2 coupled to the liquid supply system of FIG. 4 in a first arrangement.

FIG. 5 shows the apparatus 200 of FIG. 2 attached to the printer ink circuit 400 of FIG. 4, in this specific example via the purge port 460, and with the printer head 440 fluidly de-coupled (i.e. disconnected) and the main ink supply 420 also fluidly de-coupled (i.e. disconnected). Fluidly de-coupled may mean outright disconnection of the respective entity or simply the closing of a respective valve, for example, such that fluid can no longer pass into or out of the respective entity. Thus, the tool may determine the volume Vt. A relatively higher pressure (but without exceeding the maximum pressure capability of the remaining portion of the liquid supply system) may be used in this scenario, since there are no pressure sensitive components involved (such as the print head).

Figure 6:
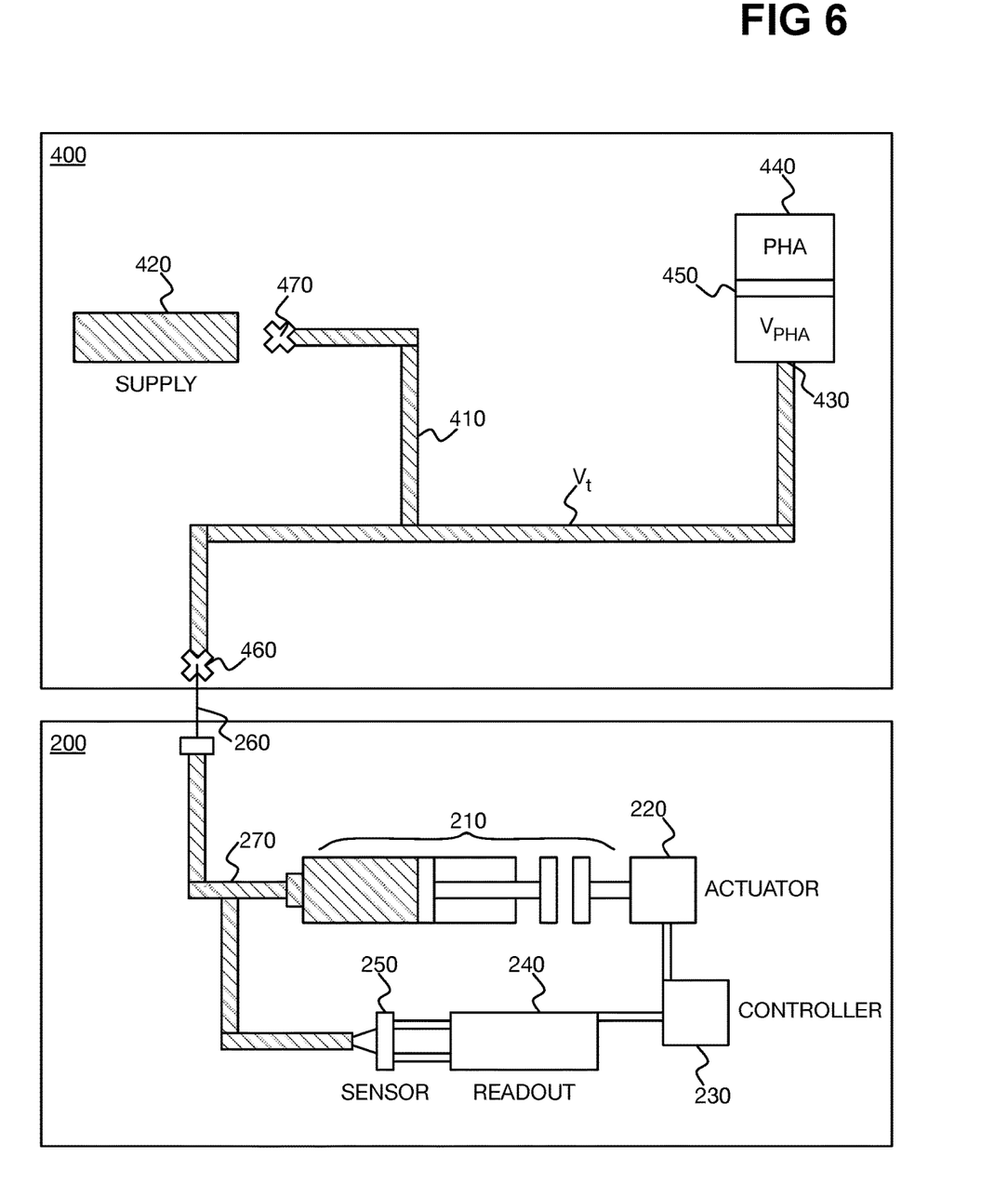
FIG. 6 shows a schematic diagram of the example gas volume measurement apparatus of FIG. 2 coupled to the liquid supply system of FIG. 4 in a second arrangement.

Meanwhile, FIG. 6 shows the same apparatus as FIG. 5, but now in an arrangement with the printer head 440 attached, allowing measurement of Vt and $V_{PHA}$. The volume $V_{PHA}$ alone is therefore easily derived also, by subtraction, for example.

Figure 7:
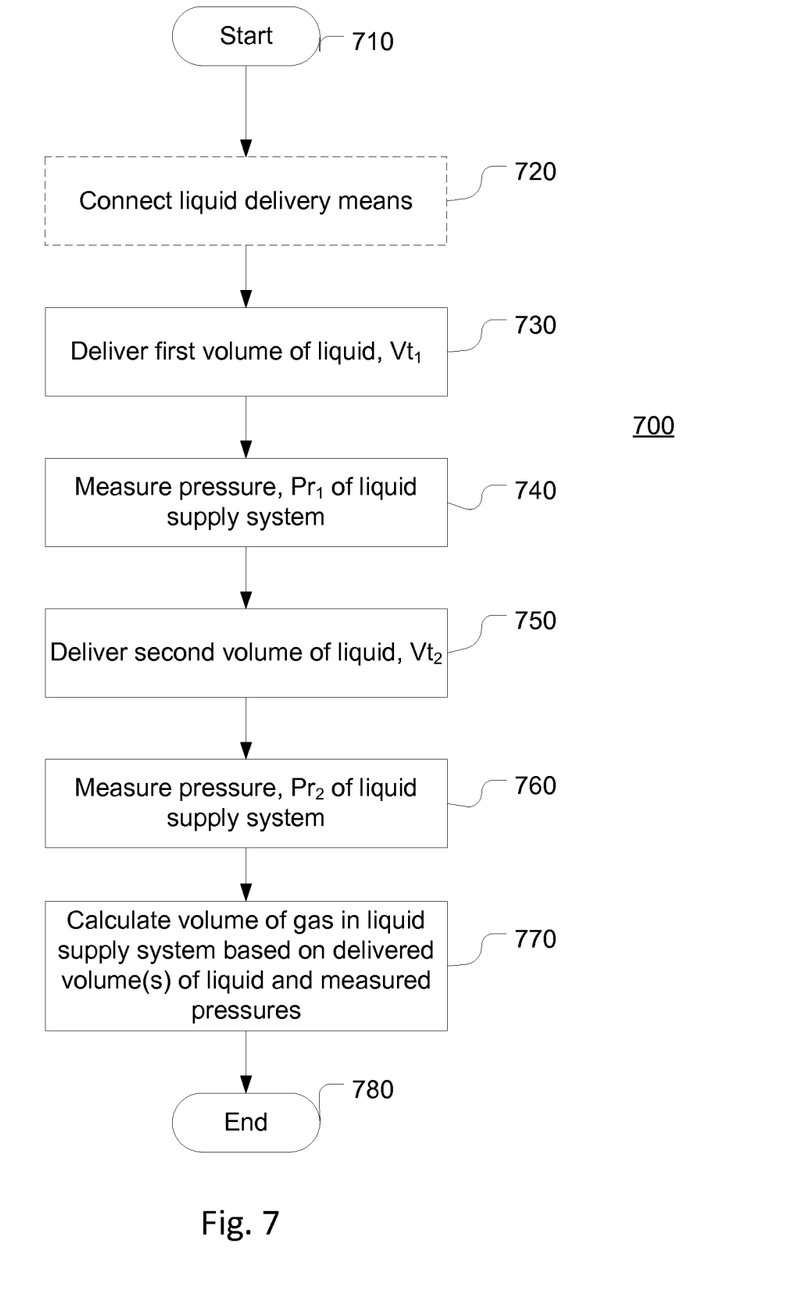
FIG. 7 shows an example flow chart depicting a method of measuring the volume of gas contained in liquid supply system.

Referring now to FIG. 7, a flow diagram 700 is presented showing an example method of measuring the volume of air trapped in a liquid supply system according to the present disclosure.

Starting at 710, the liquid supply system may be connected to the measurement tool apparatus as depicted in for example FIG. 5 720, for example via purge port 460 or another suitable port designed to introduce minimal air upon connection. A quantity of fluid (e.g. ink) $Vt_1$ may be delivered into the liquid supply system 730, at a first stage, for example via operation of actuator 220 on the fluid reservoir, thus creating pressure in liquid delivery means 210. Relative pressure $Pr_1$ may be recorded as a result of the introduction of the quantity of liquid $Vt_1$ 740 via pressure sensor 250 (and may be displayed on pressure readout 240). A second quantity of liquid $Vt_2$ may be then delivered into the liquid supply circuit 750, at a second stage, via the same process of actuator 220, creating further pressure in liquid delivery means 210. A second, increased pressure reading Pre may be recorded 760 via pressure sensor 250 (and may be displayed on pressure readout 240). Any quantity of gas trapped inside the liquid supply system may then be calculated 770 using the volume of inserted ink at the second stage ($\Delta Vt_2$, which may be derived from $Vt_1$ and $Vt_2$), and resultant change in pressure (derived from measured pressures $Pr_1$ and $Pr_2$).

Examples implementations may provide an apparatus for measuring a volume of a compressible gas contained in a liquid supply system, comprising liquid delivery means fluidly coupled to the liquid supply system and configured to deliver known volumes of liquid to the liquid supply system, a pressure sensor fluidly coupled to the liquid supply system and configured to measure pressure in the liquid supply system, and a controller electrically coupled to the pressure sensor and configured to determine a first pressure of the liquid supply system from the pressure sensor after the liquid delivery means has delivered a first known volume of liquid into the liquid supply system, determine a second pressure of the liquid supply system from the pressure sensor after the liquid delivery means has delivered a second known volume of liquid into the liquid supply system, and determine the volume of compressible gas in the liquid supply system from the second known volume of liquid ($\Delta Vt2$) and the first ($Pr1$) and second ($Pr2$) pressures and an initial pressure ($P0$).

In some example implementations, the controller is further configured to direct the liquid delivery means to deliver the first and/or second known volumes of liquid into the liquid supply system.

In some example implementations, the controller is further configured to determine the volume of compressible gas in the liquid supply system using the Ideal Gas Law.

In some example implementations, the initial pressure is an atmospheric pressure In some example implementations, the controller is further configured to determine an initial atmospheric pressure from the pressure sensor.

In some example implementations, the liquid delivery means comprises a fluid reservoir and an actuator.

In some example implementations, the actuator is electrically coupled to the controller to provide the controller with an amount of actuation of the actuator and/or to provide the controller with means to actuate the actuator.

Some example implementations further comprise a connection means configured to couple to any one or more of a printing fluid supply connection, purge port or printer head interconnect of a printer, such as an ink printer.

In some example implementations, the connection means is a printing fluid supply connection, for example a needle, enclosed needle, industrial coupling, or any other coupling generally in use in the liquid supply system under test.

In some example implementations, the controller is further configured to determine a connection arrangement of the liquid delivery means to the liquid supply system and provide a volume of compressible gas inside the determined connection arrangement.

In some example implementations, the apparatus is an external test apparatus configured to measure the volume of compressible gas in a liquid ink supply system of a liquid ink based printer and wherein the liquid supply system is the ink supply system of the liquid ink based printer.

In some example implementations, the ink supply system comprises one or more ink circuits, there being an ink circuit per separate colour ink.

In some example implementations, the apparatus is a tool that may be used with any printer or test bed used during development phases of a printer. Such test beds may comprise a whole or partial printing fluid circuit of a printer. The tool may be used with any kind of liquid systems, including water, printing fluid, ink, or any other kind of printing fluid(s) used as fixers or other pre-treatments or post-treatments done during the printing.

In some example implementations, the fluid reservoir is a syringe mechanically coupled to the actuator, wherein the actuator is configured to precisely control a position of the syringe plunger In some example implementations, the compressible gas is air. The air may be atmospheric air.

In some example implementations, the apparatus is configured to operate at a known external pressure.

In some example implementations, the known external pressure is an atmospheric pressure, such as sea-level atmospheric pressure.

In some example implementations, the liquid is a substantially incompressible liquid, wherein substantially incompressible comprises less than 1% compressible at a pressure up to 3000 psi.

In some example implementations, the liquid supply system is an ink supply system for a liquid ink based printer and wherein the liquid is a liquid ink, where the ink supply system comprises at least one ink circuit per primary/base ink colour.

In some example implementations, the apparatus further comprises a fluid delivery means, connection means and pressure sensor per printing fluid circuit, for example an ink circuit.

In some example implementations, the liquid supply system comprises a confined volume comprising at least a first portion consisting of an incompressible liquid and at least a second portion consisting of a compressible gas.

In some example implementations, the liquid supply system further comprises at least one further third portion consisting of an incompressible liquid, wherein the at least a second portion is interspersed or disposed between the first and third incompressible liquid portions.

The liquid in use in the liquid delivery means and/or liquid supply system may have a low level of gas dissolved therein. The compressible gas may be the non-dissolved gas—i.e. comprises gas that has not been dissolved into the liquid.

In some example implementations, the difference between first and second pressures falls in a range (relative to the initial pressure) suitable for the liquid supply system under test. For example, a range of suitable pressures may be between atmospheric pressure (zero relative pressure) and the maximum pressure admissible in the system under test. In an example of an ink circuit of an ink printer, this may be the printer ink circuit maximum pressure admissible before leakage and/or damage to the ink circuit including printer head occurs. This maximum value depend on the type of printer (i.e. printer specifications). This means the damage potentially caused by operation of the example apparatuses and methods is less than the damage that could be caused by air in the liquid supply system during normal use of the liquid supply system. For example, in examples applied to liquid ink based printers, the pressures and volumes used are lower than those experience during normal printing.

In some example implementations, the pressure sensor is coupled to the liquid supply system between the connection means and the fluid delivery means. In other example, the pressure sensor may be coupled at any point in the liquid supply system.

Example implementations may also provide a method for measuring a volume of a compressible gas contained in a liquid supply system, comprising configuring a liquid delivery means to deliver known volumes of liquid to the liquid supply system, determining a first pressure of the liquid supply system after the liquid delivery means has delivered a first known volume of liquid into the liquid supply system, determining a second pressure of the liquid supply system after the liquid delivery means has delivered a second known volume of liquid into the liquid supply system, and determining the volume of compressible gas trapped in the liquid supply system from the second known volume of delivered liquid and the first and second pressures.

Some example implementations further comprise using an initial pressure in determining the volume of compressible gas trapped in the liquid supply system.

Some example implementations further comprise measuring an initial pressure of the liquid supply system In some example implementations determining the volume of compressible gas trapped in the liquid supply system comprises using an Ideal Gas Law in the determining.

Some example implementations further comprise determining an arrangement of the liquid supply system and determining a volume of gas trapped in the determined arrangement. Volumes of trapped gases in different arrangements may be measured. The different volumes may be used to determine volumes of gases trapped in a non-isolated arrangement by means of addition or subtraction.

Some example implementations further comprise fluidly coupling a liquid delivery means to a liquid supply system.

Some example implementations further comprise carrying out a purging operation on the liquid supply system, to purge any compressible gas before or after measuring the volume of compressible gas contained in the liquid supply system.

In some example implementations, if the purging operation occurs before, the method further comprises determining a level of success of the purging operation based on the measured volume of compressible gas. Then, the method may further comprise adjusting the purging operation in response to the determined level of success.

The liquid supply system may be a printing fluid supply circuit of a printer. In which case, some examples provide a printing system, comprising liquid delivery means fluidly couplable to a printing fluid supply circuit of the printing system to deliver known volumes of printing fluid to the printing fluid supply circuit, a pressure sensor fluidly couplable to the printing fluid supply circuit and configured to measure pressure in the printing fluid supply circuit, and a controller electrically coupled to the pressure sensor and configured to determine a first pressure of the printing fluid supply circuit from the pressure sensor after the liquid delivery means has delivered a first known volume of printing fluid into the printing fluid supply circuit, determine a second pressure of the printing fluid supply system from the pressure sensor after the liquid delivery means has delivered a second known volume of liquid into the printing fluid supply circuit, and determine a volume of compressible gas in the printing fluid supply circuit from the second known volume of printing fluid and the first and second pressures and an initial pressure.

In some examples, a support structure may be provided to house any of the disclosed apparatuses. The support structure may be a portable device or formed as part of another apparatus that uses the liquid supply system.

The actuator(s) according to some examples may be manually driven, electrically driven, electronically driven, or combination thereof. In some examples, the actuator(s) may have position control and/or position sensing.

Example implementations can provide a testing/measurement tool, for example, the device shown in or described with reference to FIGS. 2 and 3. The testing/measurement tool can comprise a controller, circuitry or processor to control the testing/measurement tool to carry out the method according to any method as described or claimed herein. The controller, circuitry or processor may control the action (or measure an output of) any of the actuators, sensors, or any coupling components, such as ports, valves or other liquid control devices used to couple the apparatus or parts thereof to a liquid supply system under test. Similarly, example implementations can provide a controller, circuitry or processor for controlling a testing/measurement tool; the controller comprising circuitry or a processor to orchestrate or implement any method as described or claimed herein. Furthermore, any such methods can be realised, at least in part, using machine executable code comprising instructions arranged, when executed by at least one processor, to control or implement any method described or claimed herein. Example, implementations provide non-transitory machine readable storage storing such machine executable code.

In some examples, the measurement tool may be incorporated into the printer, for example, for use in commissioning or servicing the printer. In some examples, the testing/measurement tool is a hand held device for attachment by a service operator for testing of the printer and/or printing mechanisms in development.

Examples may use any disclosed equations, or equivalents to determine the volume of gas, or liquid, in a liquid delivery system.

In some example implementations, the method may be implemented as a set of instructions stored in non-transitory form on a computer readable medium. When the set of instructions are carried out by one or more processors coupled to a testing apparatus, as also disclosed, results in the processor measuring the volume of gas contained or trapped in a confined volume of a liquid supply system.

The invention claimed is:

1. An apparatus comprising:
a reservoir fluidly couplable to a liquid supply system;
an actuator configured to deliver known volumes of liquid from the reservoir to the liquid supply system;
a pressure sensor fluidly couplable to the liquid supply system and configured to measure pressure in the liquid supply system; and
a controller electrically coupled to the pressure sensor and configured to:
determine a first pressure of the liquid supply system from the pressure sensor after the actuator has delivered a first known volume of liquid into the liquid supply system from the reservoir;
determine a second pressure of the liquid supply system from the pressure sensor after the actuator has delivered a second known volume of liquid into the liquid supply system from the reservoir; and
determine a volume of compressible gas in the liquid supply system from the second known volume of liquid, an initial pressure, the first pressure, the second pressure, and a difference mathematically calculated by subtracting the first pressure from the second pressure.

2. The apparatus of claim 1, wherein the controller is further configured to direct the actuator to deliver the first and/or second known volumes of liquid into the liquid supply system from the reservoir.

3. The apparatus of claim 1, wherein the controller is further configured to determine the volume of compressible gas in the liquid supply system using an Ideal Gas Law.

4. The apparatus of claim 1, wherein the controller is further configured to determine an initial atmospheric pressure from the pressure sensor.

5. The apparatus of claim 1, wherein the actuator is electrically coupled to the controller to provide the controller with an amount of actuation of the actuator.

6. The apparatus of claim 5, wherein the fluid reservoir is a syringe mechanically coupled to the actuator, wherein the actuator is configured to control a position of a plunger of the syringe.

7. The apparatus of claim 1, wherein the controller is further configured to determine a connection arrangement of the reservoir to the liquid supply system and provide a volume of compressible gas inside the determined connection arrangement.

8. The apparatus of claim 1, wherein the apparatus is an external test apparatus configured to measure the volume of compressible gas in a printing fluid supply system of a printer and wherein the liquid supply system is the printing fluid supply system of the printer.

9. The apparatus of claim 1, wherein the volume of compressible gas is determined from the first pressure and the second pressure in that the volume of compressible gas is determined from a product of the first pressure and the second pressure, in addition to from the second known volume of liquid, the initial pressure, and the difference mathematically calculated by subtracting the first pressure from the second pressure.

10. The apparatus of claim 9, wherein the volume of compressible gas is determined from the initial pressure and from the product of the first pressure and the second pressure in that the volume of compressible gas is determined from the product of the first pressure and the second pressure divided by the initial pressure, in addition to from the second known volume of liquid and the difference mathematically calculated by subtracting the first pressure from the second pressure.

11. The apparatus of claim 10, wherein the volume of compressible gas is determined from the product of the first pressure and the second pressure divided by the initial pressure and from the difference mathematically calculated by subtracting the first pressure from the second pressure in that the volume of compressible gas is determined from the product of the first pressure and the second pressure divided by a product of the initial pressure and the difference mathematically calculated by subtracting the first pressure from the second pressure.

12. The apparatus of claim 1, wherein the volume of compressible gas is determined from a product of the first pressure, the second pressure, and the second known volume, divided by a product of the initial pressure and the difference mathematically calculated by subtracting the first pressure from the second pressure.

13. A method comprising:
configuring an actuator to deliver a known volume of liquid from a reservoir to a liquid supply system;
determining a first pressure of the liquid supply system after delivery of a first known volume of liquid into the liquid supply system;
determining a second pressure of the liquid supply system after delivery of a second known volume of liquid into the liquid supply system; and
determining a volume of compressible gas trapped in the liquid supply system from the second known volume of delivered liquid, an initial pressure, the first pressure, the second pressure, and a difference mathematically calculated by subtracting the first pressure from the second pressure.

14. The method of claim 13, further comprising measuring the initial pressure of the liquid supply system.

15. The method of claim 13, wherein determining the volume of compressible gas trapped in the liquid supply system comprises using an Ideal Gas Law.

16. The method of claim 13, further comprising determining an arrangement of the liquid supply system and determining a volume of gas trapped in the determined arrangement.

17. A printing system comprising:
a reservoir fluidly couplable to a printing fluid supply circuit of the printing system;
an actuator to deliver known volumes of printing fluid from the reservoir to the printing fluid supply circuit;
a pressure sensor fluidly couplable to the printing fluid supply circuit and configured to measure pressure in the printing fluid supply circuit; and
a controller electrically coupled to the pressure sensor and configured to:
determine a first pressure of the printing fluid supply circuit from the pressure sensor after the actuator has delivered a first known volume of printing fluid into the printing fluid supply circuit from the reservoir;
determine a second pressure of the printing fluid supply system from the pressure sensor after the actuator has delivered a second known volume of printing fluid into the printing fluid supply circuit from the reservoir; and
determine a volume of compressible gas in the printing fluid supply circuit from the second known volume of printing fluid, an initial pressure, the first pressure, the second pressure, and a difference mathematically calculated by subtracting the first pressure from the second pressure.

* * * * *